(12) United States Patent
Gajjar

(10) Patent No.: US 8,294,406 B2
(45) Date of Patent: Oct. 23, 2012

(54) PARALLEL KINEMATICS MICRO-POSITIONING SYSTEM

(76) Inventor: Bhargav Ishwarlal Gajjar, Arlington, MA (US)

( * ) Notice: Subject to any disclaimer, the term of this patent is extended or adjusted under 35 U.S.C. 154(b) by 394 days.

(21) Appl. No.: 12/754,401

(22) Filed: Apr. 5, 2010

(65) Prior Publication Data

US 2010/0253275 A1   Oct. 7, 2010

Related U.S. Application Data

(60) Provisional application No. 61/167,124, filed on Apr. 6, 2009.

(51) Int. Cl.
*G05B 19/21* (2006.01)
(52) U.S. Cl. .............. 318/649; 318/600; 901/2
(58) Field of Classification Search .......... 318/600–603, 318/648, 649; 901/2, 14, 15, 23, 28
See application file for complete search history.

(56) References Cited

U.S. PATENT DOCUMENTS

| | | | |
|---|---|---|---|
| 2003/0180132 A1* | 9/2003 | Morreim | 414/458 |
| 2007/0121224 A1* | 5/2007 | Shibazaki | 359/813 |
| 2010/0001616 A1* | 1/2010 | Ferreira et al. | 310/300 |

\* cited by examiner

*Primary Examiner* — Bentsu Ro
(74) *Attorney, Agent, or Firm* — Michael Ries

(57) ABSTRACT

The present invention is a parallel kinematic linkage based micro-positioning system that can provide precise movement at the micron and sub-micron level of a payload that is compatible with an existing automation system. The system has a motor controller, a digital signal processor, a base frame, a first motor, a first cranking arm with a first connecting link and an intermediate stage that mounts a second motor that is attached to a second cranking arm with a second connecting link. There is also an output stage (also called a table) that is precisely moved by the second cranking arm and a first and second optical linear encoder used in combination with the first and second motor and the first and second cranking arm forming a first motor assembly that converts operational data into a plurality of highly precise X-axes and Y-axes payload linear movements.

20 Claims, 5 Drawing Sheets

PARALLEL KINEMATICS MICRO-POSITIONING SYSTEM

This application claims priority to U.S. Provisional Application 61/167,124 filed on Apr. 6, 2009, the entire disclosure of which is incorporated by reference.

TECHNICAL FIELD & BACKGROUND

The present invention generally relates to a parallel kinematic micro-positioning system. More specifically, the invention is a parallel kinematic micro-positioning system that uses a motorized multi-linked, low inertia, low friction parallel rotary joint arm to actuate or drive a 1, 2 or 3 or more axes of a stage that results in a precise movement of an object or payload that is compatible with an existing automation system.

It is also an object of the invention to provide a parallel kinematic micro-positioning system that can provide precise movement of an object or payload at the micron and sub-micron level within a small space with a thin profile that is compatible with an existing automation system.

It is also an object of the invention to provide a parallel kinematic micro-positioning system that can provide precise movement of an object or payload at the micron and sub-micron level that is compatible with an existing automation system that is inexpensive to make.

What is really needed is a parallel kinematic micro-positioning system that can provide precise movement of an object or payload at the micron and sub-micron level that is compatible with an existing automation system that is inexpensive to make and can operate within a small space with a thin profile.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
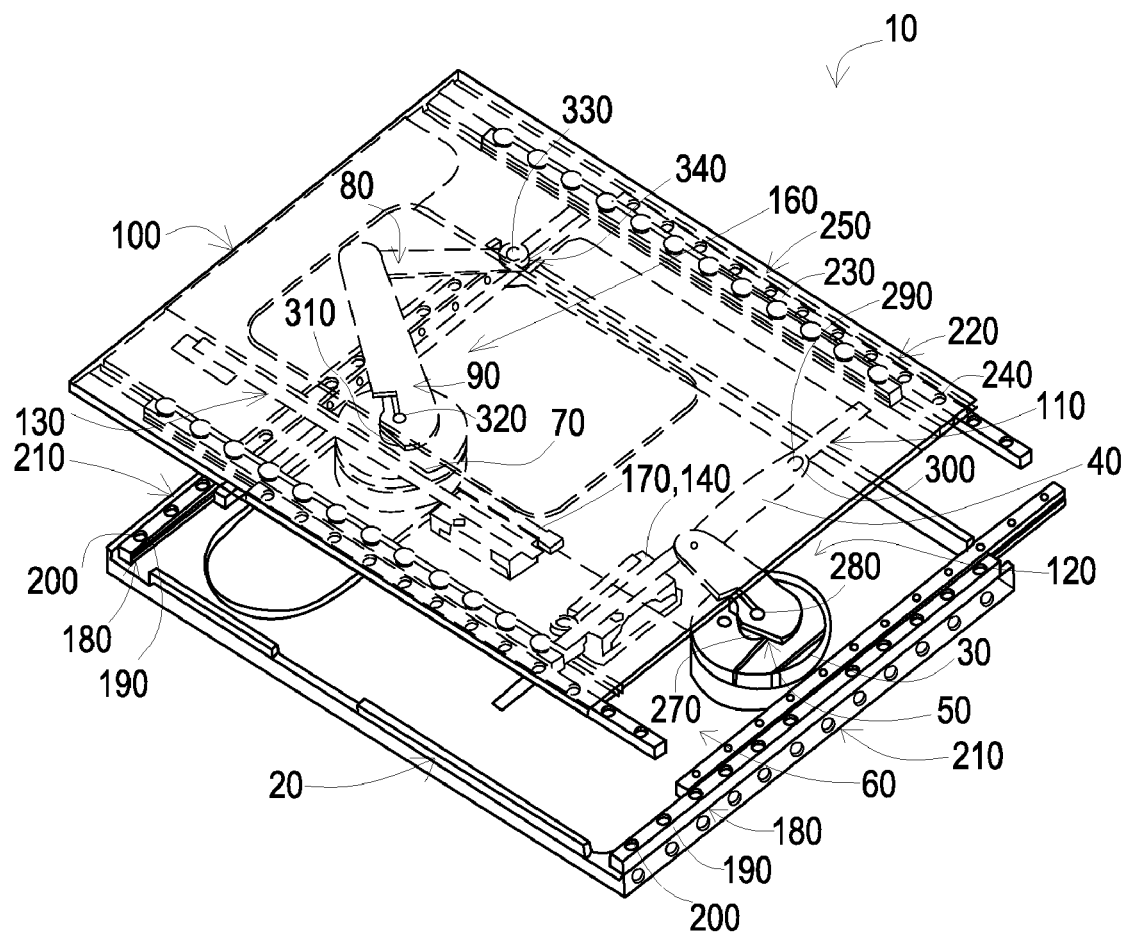
FIG. 1 illustrates an overhead diagonal perspective view of a parallel kinematic micro-positioning system, in accordance with one embodiment of the present invention.

FIG. 1 illustrates an overhead diagonal perspective view of a parallel kinematic micro-positioning system 10, in accordance with one embodiment of the present invention. The parallel kinematic micro-positioning system 10 can provide precise movement at the micron and sub-micron level of a payload (not shown), that is compatible with an existing automation system, such as those found in automated manufacturing, analytical instrumentation, life sciences, medical devices, packaging industries and semiconductor industries. The parallel kinematic micro-positioning system has a base frame 20 that mounts a first motor 30 that is attached to a first cranking arm 40 with a first connecting link 50. There is also an intermediate stage 60 that mounts a second motor 70 that is attached to a second cranking arm 80 with a second connecting link 90 and an output stage and table 100 with a payload that is precisely moved by the second cranking arm 80.

The parallel kinematic micro-positioning system 10 also utilizes a first optical linear encoder 110 used in combination with the first motor 30 and the first cranking arm 40 forming a first motor assembly 120 that converts operational data into a plurality of precise X-axis payload movements. There is also a second optical linear encoder 130 used in combination with the second motor 140 and the second cranking arm 80 forming a second motor assembly 160 that converts operational data into a plurality of precise Y-axis payload movements. There is also a motor controller (FIGS. 4 and 5, 170) that governs movement of the first motor 30 and second motor 70 and a digital signal processor 140 that processes and controls the operational data involved with the motor controller and the micro-positioning system 10. There is also a first pair of roller tracks 180, a first plurality of roller bearings 190 and a first plurality of fasteners 200 for the first roller bearings 190 forming a first roller assembly 210 disposed underneath the intermediate stage 60 to move the intermediate stage 60 according to the operational data, the motor controller 170 and the digital signal processor 140.

There is also a second pair of roller tracks 220, a second plurality of roller bearings 230 and a second plurality of fasteners 240 for the second roller bearings 230 forming a second roller assembly 250 disposed underneath the output stage and table 100 to move the output stage and table 100 according to the operational data, the motor controller 170 and the digital signal processor 140. There is also a first bearing and pin joint 270 that connects the first cranking arm 80 to a first connecting link pin 280 of the first connecting link 50 and a second bearing and pin joint 290 that connects a third connecting link 300 to the intermediate stage 60. There is also a third bearing and pin joint 310 that connects the second cranking arm 80 to a second connecting link pin 320 of the second connecting link 90 and a fourth bearing and pin joint 330 that connects a fourth connecting link 340 to the output stage and table 100.

Figure 2:
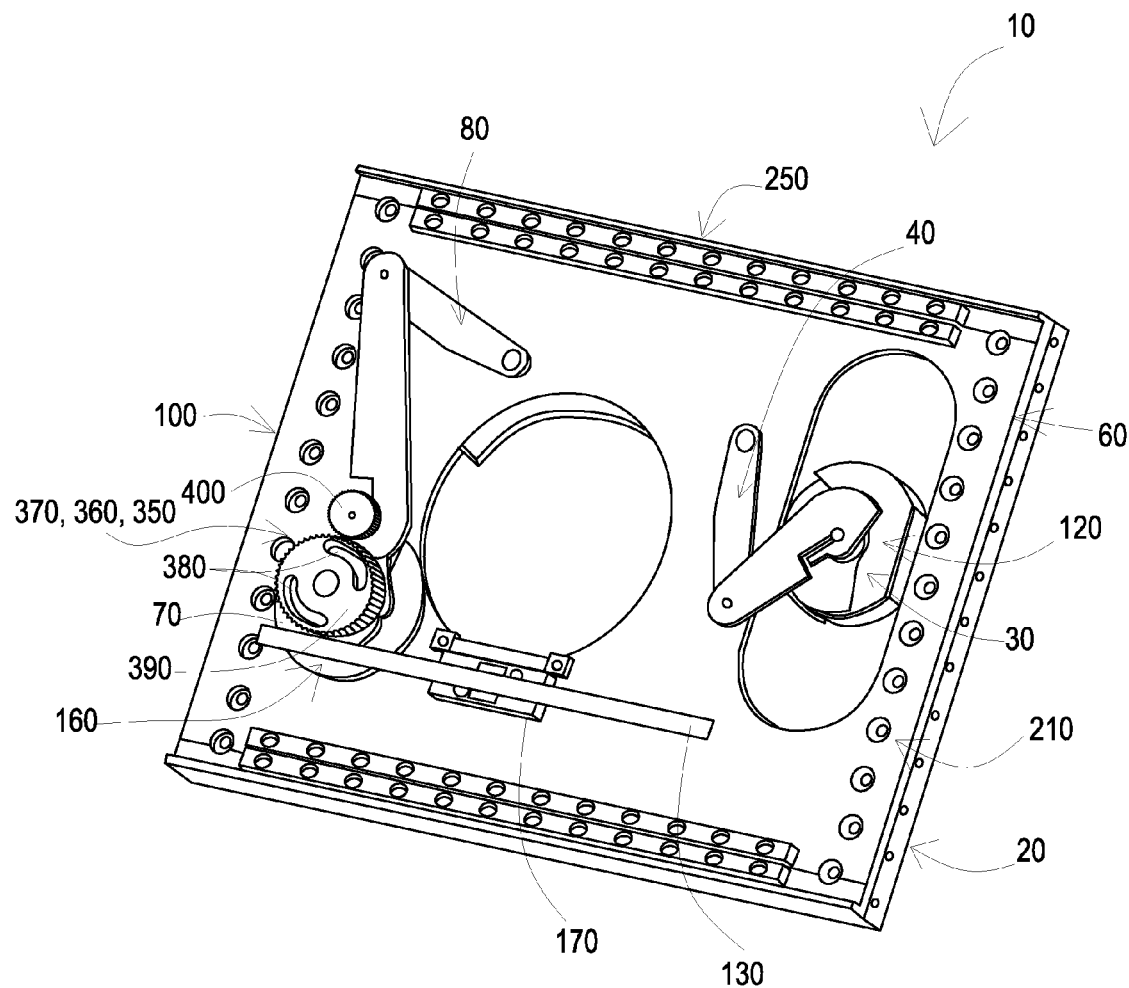
FIG. 2 illustrates an overhead perspective view of a parallel kinematic micro-positioning system, in accordance with one embodiment of the present invention.

FIG. 2 illustrates an overhead perspective view of a parallel kinematic micro-positioning system 10, in accordance with one embodiment of the present invention. This embodiment of the parallel kinematic micro-processing system 10 utilizes an anti-backlash gearing mechanism 350 disposed between each of the motors 30,70 and each of the cranking arms 40,80 to prevent any backlash from any cranking arm 40,80 movement. The micro-positioning system 10 anti-backlash gearing mechanism 350 is a spur gear stage 360 between the second motor 70 and the second cranking arm 80. The anti-backlash mechanism 350 more specifically is a split gear 370 that is pre-loaded in rotation by a plurality of springs 380 that rotate a free gear 390 relative to a fixed gear 400 of the split gear 370.

The introduction of a spur gear stage 360 can be advantageous since it will result in an increase in the resolution of the linear positioning stage (i.e. a decrease in the linear displacement of the stage for a given angular displacement of the motor). However, backlash in the spur gear stage 360 should be eliminated to achieve this increased resolution. Specialized miniaturized gear designs are widely available (or can be manufactured) that can provide backlash-free performance. One of the more common designs splits the gear 370 into two gears, each half the thickness of the original but, with identical pitch and tooth geometry. One half of the gear 390 is fixed to its shaft while the other half of the gear 400 is allowed to turn on the shaft, but is pre-loaded in rotation by small springs 380 that rotate the free gear 390 relative to the fixed gear 400. In this way, the spring tension rotates the free gear 390 until all of the backlash in the system has been eliminated. The teeth of the fixed gear 400 press against one side of the teeth of the pinion while the teeth of the free gear 390 press against the other side of the teeth on the pinion. Loads smaller than the force of the springs 380 do not compress the springs 380, and hence no gaps are present between the teeth to be taken up. In this manner backlash is eliminated.

In FIG. 2, the driver motor 70 has an anti-backlash gear and is connected to the driven gear with a ratio $N_1:N_2$. Let $\omega_1, \omega_2$ be the angular speeds of the driver 360 and driven 400 gears respectively, then:

$$\frac{\omega_2}{\omega_1} = \frac{N_1}{N_2}$$

In equation $$\frac{\omega_2}{\omega_1} = \frac{N_1}{N_2},$$

if $N_1 > N_2$, $\omega_2 > \omega_1$, means the angular displacement and speed of output 400 is greater than that of the input 360, for a fixed angular displacement of the input 360. Slowing down the input with respect to the output can help in terms of the bandwidth required by the microprocessor 140 to compute the position and feedback control for driver motor 70.

A numerical example of the effect of introducing a gear stage is as follows. Assume that the stage output position is measured using a Renishaw tonic linear encoder 110 with a maximum stage speed of 3.24 m/s at 0.1 μm resolution. Thus the frequency of output measurement is:

$$f_2 = \frac{3.24 \text{ m/s}}{0.1 \times 10^{-6} \text{ m}} = 32400000 \text{ pulses/sec}$$

The maximum stage speed can be used to derive a requirement on the bandwidth of the motor. Also, the resolution of the linear encoder can be used to derive a requirement on the angular resolution of the drive motor, based on the kinematic relationship between the linear stage position and the motor angular position. This latter requirement is also influenced by the anti-backlash spur gear stage gear ratio, here assumed to be a factor of $$\frac{N_2}{N_1} : f_1 = \frac{N_2}{N_1} f_2$$

Since $N_2 < N_1$, $f_1$ is reduced by implementing the anti-backlash spur gear reduction stage between the driver rotary motor and the parallel linkage mechanism, the motor angular resolution requirement is reduced by a factor equal to the gear ratio. Also, the motor torque applied to the parallel linkage mechanism and hence the force applied to the payload is reduced by a factor proportional to $$\frac{N_2}{N_1}.$$

Figure 3:
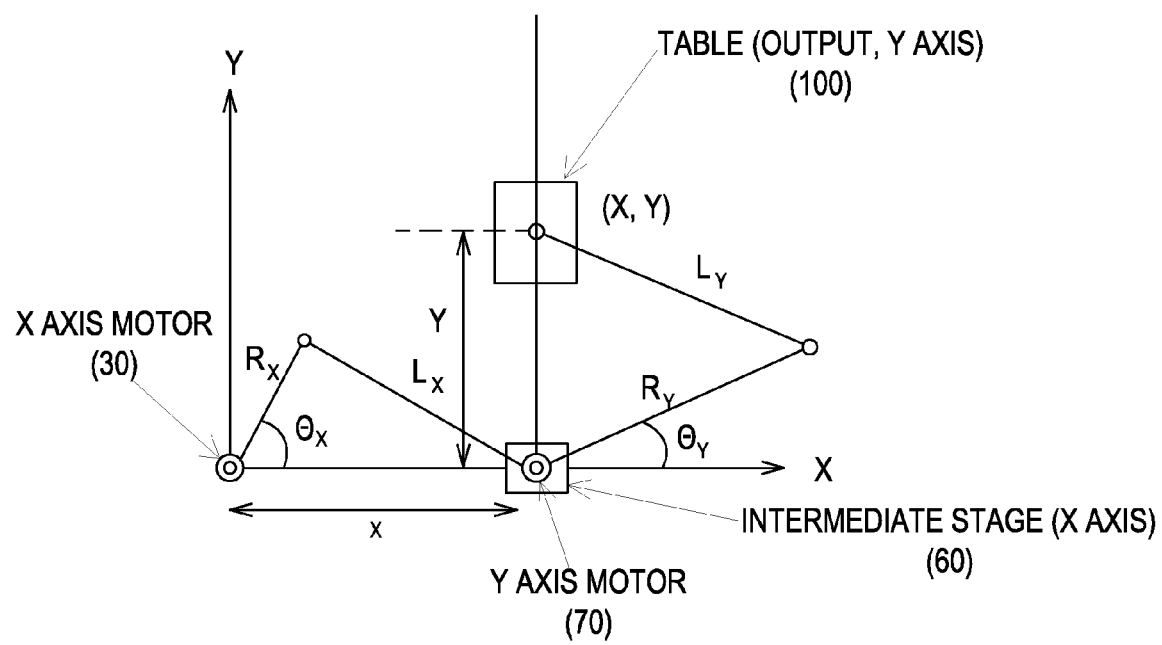
FIG. 3 is a diagram of a parallel kinematic linkage based micro-positioning system plotted along an X-axis and Y-axis, in accordance with one embodiment of the present invention.

FIG. 3, is a schematic diagram of a parallel kinematic micro-positioning system 10 plotted along an X-axis and Y-axis, in accordance with one embodiment of the present invention. As shown in FIG. 3, the linear guide for the X axis is collinear with the X axis and the Y axis motor slides on this guide. The linear guide for the Y axis is parallel to the Y axis and carries the table 100 on it at an offset x from it. The following forward kinematic equations can be gotten from FIG. 3:

$$x = R_x \cos(\theta_x) + \sqrt{L_x^2 - R_x^2 \sin^2(\theta_x)}$$

$$y = R_y \sin(\theta_y) + \sqrt{L_y^2 - R_y^2 \cos^2(\theta_y)}$$

$R_x$, $L_x$ and x bearing and $R_y$, $L_y$ and y bearing form the respective parallel kinematic high stiffness low inertia mechanisms for the stage 10. Utilizing a rotary motor allows a large input range which can provide a relatively large (i.e. several hundred mm) linear output displacement. A novel transmission (other than electromagnetic, gear, ballscrew, stick slip friction drives, oil/air pressure and elastic deformation) between the motors 30 and 70 and motor 70 and table 100 is used arising from a simple 4 link kinematic linkage mechanism which has low inertia due to slender links and high stiffness (due to triangular, fully supported truss structure), yielding a high damping characteristic that provides an excellent "stop and settle" response. The transformation of an input rotary motion to output linear motion primarily occurs through low rolling friction in the bearings of the parallel kinematic linkage mechanism joints, whose axes remain parallel due to the high stiffness truss structure of the linkage mechanism.

The parallel kinematic micro-positioning system 10 does not use any encoders on the rotary motors 30,70 but instead the motors 30,70 are commanded using joint angles computed from measured linear stage displacement and real time inverse kinematics. The linear stage displacement can be measured in very high resolution with optical encoders 110 such as the Renishaw Tonic. This eliminates the need for extremely high resolution encoders to be mounted on a motor shaft and makes the design very compact (<25 mm thick) and eliminating two rotary encoders from the stage which further reduces the cost. Due to the limited rotary displacement needed in the rotary motor 30,70, it may be feasible to replace the electromagnetic rotary motor 30,70 with a voice coil motor, sector motor or ultrasonic rotary motor to reduce limitations of each of the actuator in any state of the art configurations. Also the parallel kinematic micro-positioning system 10 can use other methods of actuation combined with parallel linkage mechanisms such as those involving AC motors, brushed DC motors, piezoelectric motors and other motors that are well known in the art that can be combined with other 4 bar linkages.

The parallel kinematic micro-positioning system 10 can be contained in a linear plane, since the design is very compact (≦25 mm thick). The parallel kinematic micro-positioning system 10 can also be constructed from planar components which are also inexpensive to manufacture.

Figure 4:
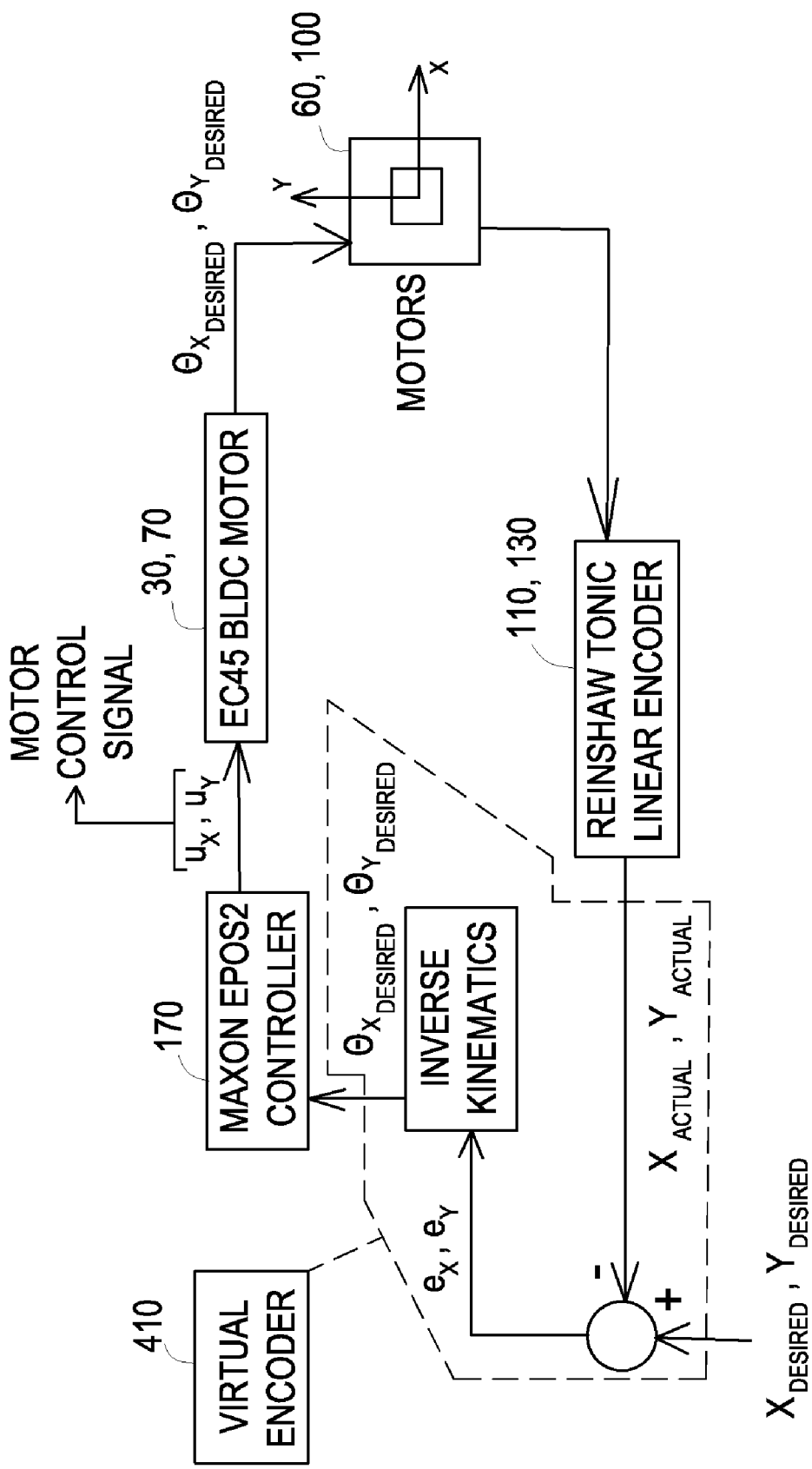
FIG. 4 is a flow diagram of a parallel kinematic micro-positioning system with a virtual encoder, in accordance with one embodiment of the present invention.

FIG. 4 is a flow diagram of a parallel kinematic micro-positioning system 10 with a virtual encoder 410, in accordance with one embodiment of the present invention. The computation of motor shaft angles when desired displacement in x and y is specified can be done using following equations. The inverse kinematics equations are used to compute motor shaft angles and the position of the motor 30,70 implementing the virtual encoding technique shown in FIG. 4. A motor controller 170 such as a Maxon EPOS 2, which has a detailed electromagnetic model of the rotary brushless motor 30,70 is fed values of the shaft angles of x and y motors ($\theta_x$ and $\theta_y$) computed in real time using a digital signal processing chip 140 like a DSPIC, within a tight feedback loop which takes the x and y actual measured positions ($x_{actual}$, $y_{actual}$) of the stage and subtracts these values from desired positions ($x_{desired}$, $y_{desired}$) to generate an error signal for both the axes ($e_x$, $e_y$) which is converted into a very high resolution quadrature encoder count using a quadrature encoding chip (not shown) integrated within a DSPIC microprocessor 140. As depicted in FIG. 1, the motors 30,70 are EC45 brushless DC motors of a pancake type motor manufactured by Maxon Motors.

$$\theta_x = \cos^{-1}\left[\left(\frac{1}{2R_x}\right)x + \left(\frac{R_x^2 - L_x^2}{2R_x}\right)x^{-1}\right]$$

$$\theta_y = \sin^{-1}\left[\left(\frac{1}{2R_y}\right)y + \left(\frac{R_y^2 - L_y^2}{2R_y}\right)y^{-1}\right]$$

Figure 5:
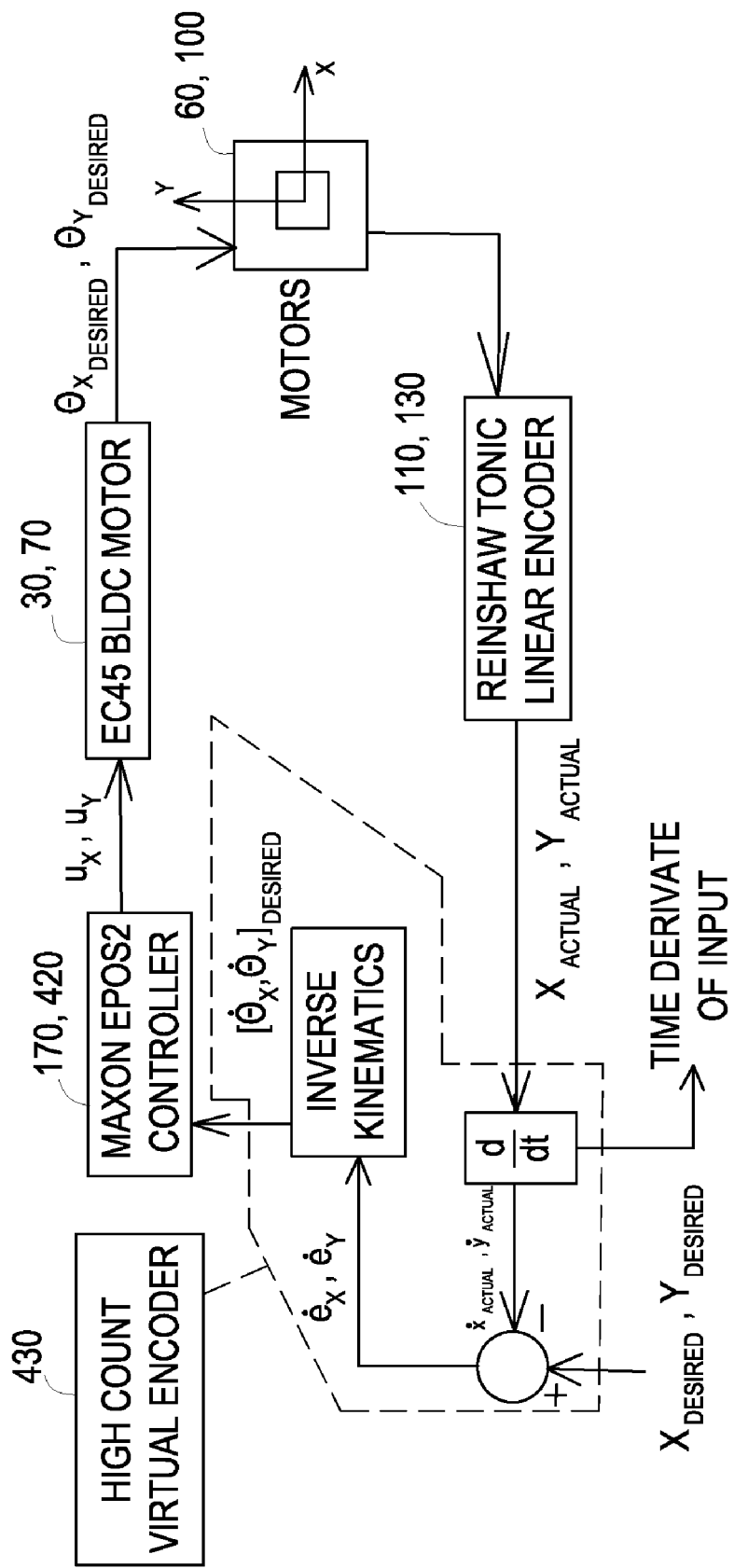
FIG. 5 is a flow diagram of a parallel kinematic micro-positioning system with a velocity controller implemented using a high count virtual encoder, in accordance with one embodiment of the present invention.

FIG. 5 is a flow diagram of a parallel kinematic micro-positioning system 10 with a velocity controller 420 implemented using a high count virtual encoder 430, in accordance with one embodiment of the present invention. Kinematic equations of motion and overall stiffness of a parallel manipulator can be used where:

$x$ = Motion of table in $X$ direction $y$ = Motion of table in $Y$ direction $\theta_x$ = Rotation of shaft of $X$ direction motor $\theta_x$ = Rotation of shaft of $Y$ direction motor $X = \begin{bmatrix} x \\ y \end{bmatrix}$ Vector of table displacements $q = \begin{bmatrix} \theta_x \\ \theta_y \end{bmatrix}$ Vector of actuator displacements $\tau = \begin{bmatrix} \tau_x \\ \tau_y \end{bmatrix}$ Vector of actuator torques The kinematic relationship of the table coordinates with respect to the origin is given by:

$f(x,q)=0$

Taking the time derivative of $$\theta_x = \cos^{-1}\left[\left(\frac{1}{2R_x}\right)x + \left(\frac{R_x^2 - L_x^2}{2R_x}\right)x^{-1}\right]$$

and allows $$\theta_y = \sin^{-1}\left[\left(\frac{1}{2R_y}\right)y + \left(\frac{R_y^2 - L_y^2}{2R_y}\right)y^{-1}\right]$$

constructing the Jacobian equation as:

$$J_x \dot{x} = J_{\theta_x} \dot{\theta}_x$$

$$J_y \dot{y} = J_{\theta_y} \dot{\theta}_y$$

Where:

$J_x = 1 = J_y$ and $$J_{\theta_x} = -R_x \sin(\theta_x) - \left[\frac{R_x^2 \sin(2\theta_x)}{2\sqrt{L_x^2 - R_x^2 \sin^2(\theta_x)}}\right]$$

$$J_{\theta_y} = R_y \cos(\theta_y) + \left[\frac{R_y^2 \sin(2\theta_y)}{2\sqrt{L_y^2 - R_y^2 \cos^2(\theta_y)}}\right]$$

$$\begin{bmatrix} 1 & 0 \\ 0 & 1 \end{bmatrix} \cdot \begin{bmatrix} \dot{x} \\ \dot{y} \end{bmatrix} = \begin{bmatrix} J_{\theta_x} & 0 \\ 0 & J_{\theta_y} \end{bmatrix} \cdot \begin{bmatrix} \dot{\theta}_x \\ \dot{\theta}_y \end{bmatrix}, \text{ where } J_x = J_y = \begin{bmatrix} 1 & 0 \\ 0 & 1 \end{bmatrix}$$

And:

$$\dot{X} = J \cdot \dot{q}$$

Equation $\dot{X}=J\cdot\dot{q}$ relates the velocities of the table with the motor rates via the mechanism Jacobian equation:

Let $$\Delta q = \begin{bmatrix} \Delta \theta_x \\ \Delta \theta_y \end{bmatrix}$$

be vector of joint deflections when $$\tau = \begin{bmatrix} \tau_x \\ \tau_y \end{bmatrix}$$

is applied.

Thus we can relate the actuator torques to the small deflections by joint stiffness as:

$$\tau = \begin{bmatrix} \tau_x \\ \tau_y \end{bmatrix} = \begin{bmatrix} k_x & 0 \\ 0 & k_y \end{bmatrix} \cdot \begin{bmatrix} \Delta\theta_x \\ \Delta\theta_y \end{bmatrix}$$

In the equation $$\tau = \begin{bmatrix} \tau_x \\ \tau_y \end{bmatrix} = \begin{bmatrix} k_x & 0 \\ 0 & k_y \end{bmatrix} \cdot \begin{bmatrix} \Delta\theta_x \\ \Delta\theta_y \end{bmatrix},$$

$k_i$ could model transmission compliance or servo stiffness (e.g. proportional gain in PID feedback loop). From the equation $$\tau = \begin{bmatrix} \tau_x \\ \tau_y \end{bmatrix} = \begin{bmatrix} k_x & 0 \\ 0 & k_y \end{bmatrix} \cdot \begin{bmatrix} \Delta\theta_x \\ \Delta\theta_y \end{bmatrix};$$

$$\begin{bmatrix} \frac{\Delta x}{\Delta t} \\ \frac{\Delta y}{\Delta t} \end{bmatrix} = \begin{bmatrix} J_{\theta_x} & 0 \\ 0 & J_{\theta_y} \end{bmatrix} \cdot \begin{bmatrix} \frac{\Delta\theta_x}{\Delta t} \\ \frac{\Delta\theta_y}{\Delta t} \end{bmatrix} \Rightarrow \begin{bmatrix} \Delta x \\ \Delta y \end{bmatrix} = \begin{bmatrix} J_{\theta_x} & 0 \\ 0 & J_{\theta_y} \end{bmatrix} \cdot \begin{bmatrix} \Delta\theta_x \\ \Delta\theta_y \end{bmatrix}$$

Where:

$J^{-1}\Delta X = \Delta q$

Substituting:

$\tau = k\Delta q = kJ^{-1}\Delta X$

The force vector acting on the table can be expressed in terms of joint torques as:

$F = J^T \tau$

Substituting torque vector from equation $\tau = k\Delta q = kJ^{-1}\Delta X$ into equation $F = J^T \tau$ we have after multiplying both sides of equation $F = J^T \tau$ with the transpose of the overall Jacobian equation:

$(J^T)^{-1}F = k\Delta q = kJ^{-1}\Delta X$ we get:

$I \cdot F = J^T = J^T k J^{-1} \Delta X$

In the equation $I \cdot F = J^T k J^{-1} \Delta X$, $J^T k J^{-1}$ is the overall stiffness matrix of the parallel manipulator. As seen from equation $I \cdot F = J^T k J^{-1} \Delta X$, the overall stiffness of the parallel manipulator is dependent on an individual axes torsional stiffness diagonal matrix k and the overall Jacobian matrix J.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A parallel kinematic micro-positioning system that can provide precise movement at the micron and sub-micron level of a payload, that is compatible with an existing automation system, comprising:
a base frame that mounts a first motor that is attached to a first cranking arm with a first connecting link;
an intermediate stage that mounts a second motor that is attached to a second cranking arm with a second connecting link;
an output stage and table with a payload that is precisely moved by said second cranking arm;
a first optical linear encoder used in combination with said first motor and said first cranking arm forming a first motor assembly that converts operational data into a plurality of precise X-axis payload movements;
a second optical linear encoder used in combination with said second motor and said second cranking arm forming a second motor assembly that converts said operational data into a plurality of precise Y-axis payload movements;
a motor controller that governs movement of said first motor and said second motor;
a digital signal processor that processes and controls said operational data involved with said motor controller and said micro-positioning system;
a first pair of roller tracks, a first plurality of roller bearings and a first plurality of fasteners for said first roller bearings forming a first roller assembly disposed underneath said intermediate stage to move said intermediate stage according to said operational data, said motor controller and said digital signal processor;
a second pair of roller tracks, a second plurality of roller bearings and a second plurality of fasteners for said second roller bearings forming a second roller assembly disposed underneath said output stage and table to move said output stage and table according to said operational data, said motor controller and said digital signal processor;
a first bearing and pin joint that connects said first cranking arm to a first connecting link pin of said first connecting link and a second bearing and pin joint that connects a third connecting link to said intermediate stage; and
a third bearing and pin joint that connects said second cranking arm to a second connecting link pin of said second connecting link and a fourth bearing and pin joint that connects a fourth connecting link to said output stage and table.

2. The micro-positioning system according to claim 1, wherein said first motor and said second motor are high performance brushless electromagnetic rotary pancake motors, voice coil motors, sector motors and ultrasound rotary motors, brushed motors, piezoelectric actuators, AC motors and other compact actuators.

3. The micro-positioning system according to claim 1, wherein said operational data are digital data and calculations and non-digital data and calculations from said encoders, said motor controller and said processor.

4. The micro-positioning system according to claim 1, said operational data includes joint angle data computed from measured linear stage displacement and real time inverse kinematics.

5. The micro-positioning system according to claim 1, wherein said existing automation system is compatible with photolithography done in a semiconductor environment, microscopy processes and gene sequencing processes.

6. A parallel kinematic micro-positioning system that can provide precise movement at the micron and sub-micron level of a payload, that is compatible with an existing automation system, comprising:
a base frame that mounts a first motor that is attached to a first cranking arm with a first connecting link;

an intermediate stage that mounts a second motor that is attached to a second cranking arm with a second connecting link;

an output stage and table with a payload that is precisely moved by said second cranking arm;

a first optical linear encoder used in combination with said first motor and said first cranking arm forming a first motor assembly that converts operational data into a plurality of precise X-axis payload movements;

a second optical linear encoder used in combination with said second motor and said second cranking arm forming a second motor assembly that converts said operational data into a plurality of precise Y-axis payload movements;

a motor controller that governs movement of said first motor and said second motor;

a digital signal processor that processes and controls said operational data involved with said motor controller and said micro-positioning system;

an anti-backlash gearing mechanism disposed between each said motor and each said cranking arm to prevent any backlash from any said cranking arm movement;

a first pair of roller tracks, a first plurality of roller bearings and a first plurality of fasteners for said first roller bearings forming a first roller assembly disposed underneath said intermediate stage to move said intermediate stage according to said operational data, said motor controller and said digital signal processor;

a second pair of roller tracks, a second plurality of roller bearings and a second plurality of fasteners for said second roller bearings forming a second roller assembly disposed underneath said output stage and table to move said output stage and table according to said operational data, said motor controller and said digital signal processor;

a first bearing and pin joint that connects said first cranking arm to a first connecting link pin of said first connecting link and a second bearing and pin joint that connects a third connecting link to said intermediate stage; and a third bearing and pin joint that connects said second cranking arm to a second connecting link pin of said second connecting link and a fourth bearing and pin joint that connects a fourth connecting link to said output stage and table.

7. The micro-positioning system according to claim 6, wherein said first motor and said second motor are high performance brushless electromagnetic rotary pancake motors, voice coil motors, sector motors, ultrasound rotary motors, AC motors, brushed motors and piezoelectric actuators.

8. The micro-positioning system according to claim 6, wherein said operational data are digital data and calculations and non-digital data and calculations from said encoders, said motor controller and said processor.

9. The micro-positioning system according to claim 6, said operational data includes joint angle data computed from measured linear stage displacement and real time inverse kinematics.

10. The micro-positioning system according to claim 6, wherein said existing automation system is compatible with photolithography done in a semiconductor environment, microscopy processes and gene sequencing processes.

11. The micro-positioning system according to claim 6, wherein said anti-backlash gearing mechanism is a spring loaded spur gear stage between said motor and said cranking arm within a parallel linkage mechanism.

12. A parallel kinematic micro-positioning system that can provide precise movement at the micron and sub-micron level of a payload, that is compatible with an existing automation system, comprising:

a base frame that mounts a first motor that is attached to a first cranking arm with a first connecting link;

an intermediate stage that mounts a second motor that is attached to a second cranking arm with a second connecting link;

an output stage and table with a payload that is precisely moved by said second cranking arm;

a first optical linear encoder used in combination with said first motor and said first cranking arm forming a first motor assembly that converts operational data into a plurality of precise X-axis payload movements;

a second optical linear encoder used in combination with said second motor and said second cranking arm forming a second motor assembly that converts said operational data into a plurality of precise Y-axis payload movements;

a motor controller that governs movement of said first motor and said second motor;

a digital signal processor that processes and controls said operational data involved with said motor controller and said micro-positioning system;

a first pair of roller tracks, a first plurality of roller bearings and a first plurality of fasteners for said first roller bearings forming a first roller assembly disposed underneath said intermediate stage to move said intermediate stage according to said operational data, said motor controller and said digital signal processor;

a second pair of roller tracks, a second plurality of roller bearings and a second plurality of fasteners for said second roller bearings forming a second roller assembly disposed underneath said output stage and table to move said output stage and table according to said operational data, said motor controller and said digital signal processor;

a first bearing and pin joint that connects said first cranking arm to a first connecting link pin of said first connecting link and a second bearing and pin joint that connects a third connecting link to said intermediate stage; and a third bearing and pin joint that connects said second cranking arm to a second connecting link pin of said second connecting link and a fourth bearing and pin joint that connects a fourth connecting link to said output stage and table.

13. The micro-positioning system according to claim 12, wherein said first motor and said second motor are high performance brushless electromagnetic rotary pancake motors, voice coil motors, sector motors, ultrasound rotary motors, AC motors, DC brushed motors and piezoelectric actuators.

14. The micro-positioning system according to claim 12, wherein said operational data are digital data and calculations and non-digital data and calculations from said encoders, said motor controller and said processor.

15. The micro-positioning system according to claim 12, said operational data includes joint angle data computed from measured linear stage displacement and real time reverse kinematics.

16. The micro-positioning system according to claim 12, wherein a high count virtual encoder is used to compute a motor shaft angle and position said motors.

17. The micro-positioning system according to claim 12, wherein a velocity controller is implemented using said high count virtual encoder.

18. The micro-positioning system according to claim 17, wherein said velocity controller is implemented using a high count virtual encoder.

19. The micro-positioning system according to claim 12, wherein said stages and table are formed by a partially complaint mechanism with minimal flexures occurring in said joints and bearings.

20. The micro-positioning system according to claim 12, wherein said existing automation system is compatible with photolithography done in a semiconductor environment, microscopy processes and gene sequencing processes.

* * * * *